United States Patent
Bühring

(10) Patent No.: US 6,710,626 B1
(45) Date of Patent: Mar. 23, 2004

(54) DATABUS TRANSMITTER

(75) Inventor: Peter Bühring, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 676 days.

(21) Appl. No.: 09/606,337

(22) Filed: Jun. 29, 2000

(30) Foreign Application Priority Data

Jun. 30, 1999 (DE) .......................... 199 30 094

(51) Int. Cl.[7] .......................................... H03K 19/0175
(52) U.S. Cl. .......................................... 326/88; 326/92
(58) Field of Search ............. 326/88, 92; 327/536–537, 327/544

(56) References Cited

U.S. PATENT DOCUMENTS 4,482,815 A * 11/1984 Orengo ........................ 307/44
5,475,335 A * 12/1995 Merrill et al. ............... 327/536

* cited by examiner

Primary Examiner—Don Le
(74) Attorney, Agent, or Firm—Aaron Walker

(57) ABSTRACT

For a minimal electromagnetic radiation during transition between its states, a transmitter for a two-wire, differential databus on which a dominant state can be impressed by means of the transmitter in an active state of the transmitter, and which is in a recessive state when all transmitters connected to the databus are in a passive state, is characterized in that the transmitter is provided with a capacitance (6) and switching means (7, 8, 9, 10) by means of which the capacitance (6) can be alternatively coupled to an electric source (11) or between the two databus lines (1, 2), and in that the switching means (7, 8, 9, 10) charge the capacitance (6) by means of the electric source (11) during periods when the transmitter is in a passive state, and couple the capacitance (6) between the two databus lines (1, 2) during periods when the transmitter is in an active state.

14 Claims, 1 Drawing Sheet

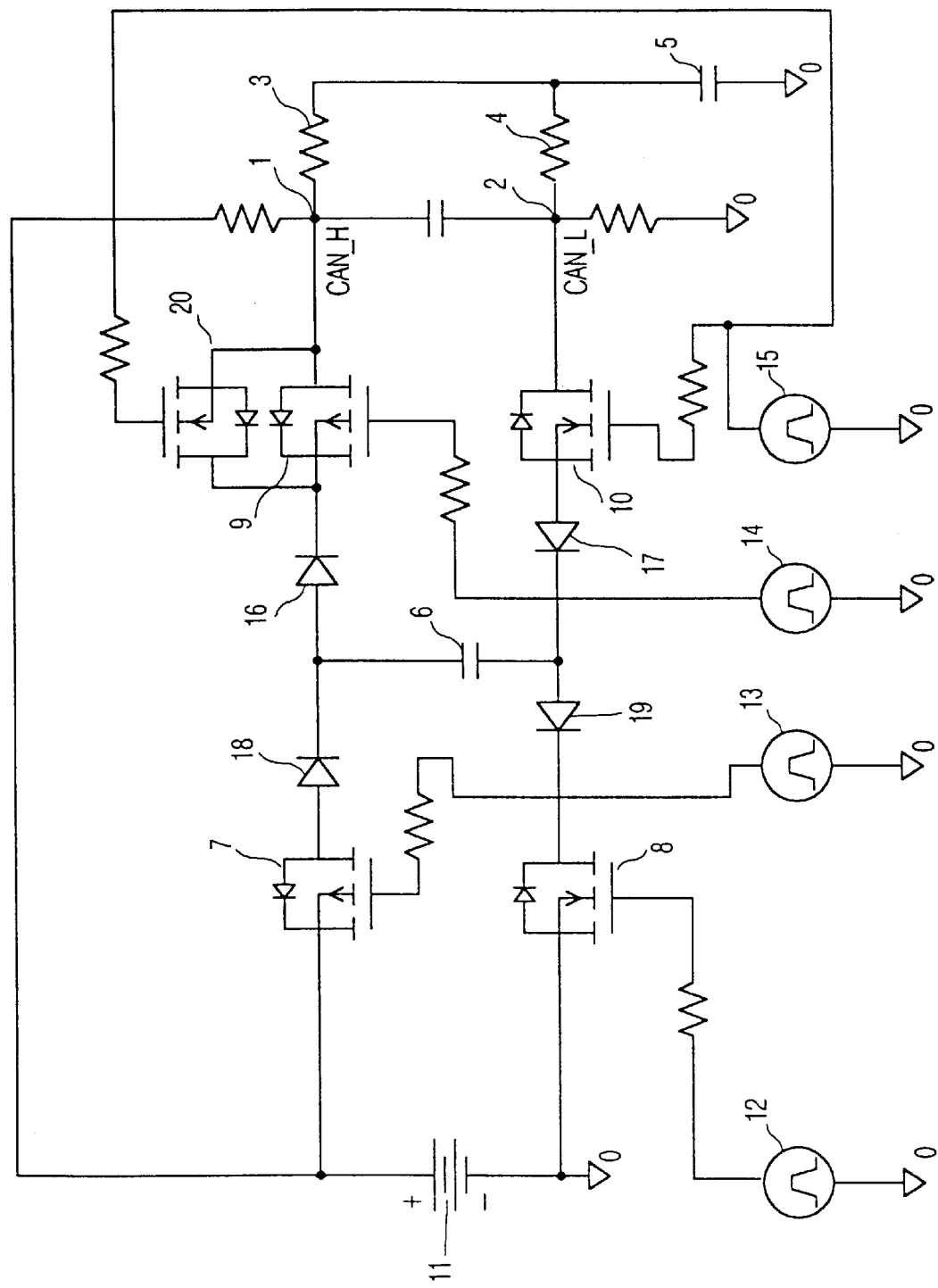

DATABUS TRANSMITTER

BACKGROUND OF THE INVENTION

The invention relates to a transmitter for a two-wire, differential databus on which a dominant state can be impressed by means of the transmitter in an active state of the transmitter, and which is in a recessive state when all transmitters connected to the databus are in a passive state.

Such transmitters, for example, for the so-called CAN databus, are characterized in that in their active state, in which they impress the dominant state on the databus, one line of the databus is set to a high level and the other line of the databus is set to a low level. When this is done simultaneously, there will be hardly any electromagnetic radiation because the radiation of one bus line then compensates the radiation of the other bus line with the reverse sign. However, actually, this ideal state cannot be achieved because particularly the transistors used for switching the signals to the databus are not ideal. This in turn has the result that, particularly when switching on and switching off the active state or the defined level at the two databus lines, there is electromagnetic radiation via the lines of the databus.

In some known transmitters, it is attempted to reduce the radiation by dividing the terminating resistors of the databus and by connecting the junction point between the divided terminating resistors to a reference potential. It is true that the radiation can thereby be reduced but it is still high enough to have a possibly disturbing effect.

SUMMARY OF THE INVENTION

It is an object of the invention to improve a transmitter of the type described in the opening paragraph in such a way that there is a further reduced electromagnetic radiation when switching the states.

This object is achieved in that the transmitter is provided with a capacitance and switching means by means of which the capacitance can be alternatively coupled to an electric source or between the two databus lines, and in that the switching means charge the capacitance by means of the electric source during periods when the transmitter is in a passive state, and couple the capacitance between the two databus lines during periods when the transmitter is in an active state.

In contrast to known transmitters, in which a voltage source is directly connected to the lines of the databus so as to impress the dominant state on the databus in the active state, a capacitance is used in the invention which, during the active state phases of the transmitter, is connected to the two databus lines. Now, it does not matter whether the two electronic switches, by means of which the capacitance is connected to the databus, have equal switching characteristics. In fact, at the instant when the capacitance is connected via the switching means to the two lines of the databus, the voltage on the two lines of the bus is exclusively defined by the current which flows through the capacitance and not by a potential of the voltage source; on the contrary, in the transmitter according to the invention, the capacitance has a floating potential. It is thereby achieved that there will be only a minimal electromagnetic radiation, even when the two terminals of the capacitance are not connected exactly simultaneously to the databus lines.

During the periods when the transmitter is in the passive state, the capacitance is charged by means of an electric source, for example a voltage or current source. Upon a transition from the passive state to the active state, the capacitance is switched off by the voltage source and instead connected to the two databus lines. Conversely, upon a transition from the active to the passive state, the capacitance is disconnected from the databus lines and instead connected to the electric source.

It is thereby achieved with very simple means to reduce the electromagnetic radiation to a strong extent when switching between the two states.

In an embodiment of the invention as defined in claim 2, the switching means are electronic switches, two of which are provided for connection to the voltage source and for connection to the two databus lines. Advantageously, transistors, preferably DMOS transistors as defined in claim 5 are used as electronic switches in a further embodiment of the invention. DMOS transistors have a low internal resistance in the active state so that switching of the capacitance alternatively to the voltage source or the databus lines can be effected with small contact resistances.

In the case where the transmitter operates incorrectly, it might occur that it is permanently attempted to transmit a dominant bit, which is actually not in accordance with the transmission standard. In this case, the capacitance would have a high capacitive load at the databus lines. To avoid this, two diodes as defined in claim 6 may be advantageously provided for such a disturbing case, which diodes prevent the capacitance at the databus lines from operating as a capacitive load.

When DMOS transistors are used as electronic switches, two further diodes may be advantageously provided as defined in claim 7, which diodes open current paths through the DMOS transistors in the case of a short circuit, thus in the case where one or both lines of the databus are short-circuited against reference potential. This is prevented by the two additional diodes as defined in claim 7.

In accordance with a further embodiment as defined in claim 8, a further DMOS transistor, which is arranged parallel to the DMOS transistor connecting the capacitance to that databus line which has a high level in the dominant state, is connected parallel to a fifth electronic switch (20) in the form of a DMOS transistor in such a way that this transistor can be turned on, also in the case of a short circuit of this line (1) of the databus. In the case of a short circuit of that databus line which has a high level in the dominant state, the DMOS transistor connecting this line to the capacitance can no longer be turned on under circumstances. The fifth transistor may be advantageously provided to be able to connect the line to the capacitance, also in such a disturbing case.

Since the electronic switches for switching the capacitance are, in principle, to be connected either to the voltage source or to the two databus lines in substantially similar states, an embodiment as defined in claim 9 advantageously provides only a control signal which is, however, to be delayed to a small extent for both groups of electronic switches.

The databus transmitter according to the invention may be advantageously provided particularly for a CAN bus (ISO 11898); all requirements imposed on the bus and on the properties of the transmitter are fulfilled, although the above-described small electromagnetic radiation is effected.

These and other aspects of the invention are apparent from and will be elucidated with reference to the embodiments described hereinafter.

BRIEF DESCRIPTION OF THE DRAWING

In the drawing:

The sole FIGURE shows a circuit diagram of a transmitter according to the invention for a CAN databus in accordance with ISO 11898. The databus, which is two-wired and differential, is represented by two junction points 1 and 2 in the FIGURE representing an imaginary extension of two lines of a databus. The first line 1 is denoted by CAN_H in the FIGURE and it is the line which has a high level in a dominant state of the databus. The second line 2, which is denoted by CAN_L in the FIGURE, is the line having a low level in the recessive state of the databus.

DESCRIPTION OF THE PREFERRED EMBODIMENTS

In the embodiment shown in the FIGURE, the terminating resistor of the databus is divided into two parts. Thus, a first terminating resistor 3 and a second terminating resistor 4 are provided whose junction point is connected via a capacitance 5 to a reference potential 0. Due to the division of the terminating resistor, a reduction of the electromagnetic radiation can be achieved. This reduction is, however, not so strong that the electromagnetic radiation does not have any drawbacks. Therefore, further precautions are taken in the transmitter according to the invention so as to reduce this electromagnetic radiation.

To this end, a capacitance 6 is provided which can be connected via switching means 7, 8, 9 and 10 alternatively to either a voltage source 11 or to the two lines 1 and 2 of the databus.

The switching means 7, 8, 9 and 10 are in the form of DMOS transistors in the embodiment shown in the FIGURE, which transistors have the advantage that they have a low resistance in the active state.

Therefore, a p-channel DMOS transistor 7 is provided whose source is connected to the positive terminal of the voltage source 11 and whose drain is coupled to a first terminal of the capacitance 6. The second DMOS transistor 8, which is of the n-channel type, has its source coupled to the negative terminal of the voltage source 11 and the reference potential. Its drain is coupled to the second terminal of the capacitance 6. Both gates of the DMOS transistors 7 and 8 are coupled to voltage sources 12 and 13 which supply control signals used for switching the DMOS transistors 7 and 8.

When the two DMOS transistors 7 and 8 are turned on by means of the voltage sources 12 and 30 or by the control signals supplied by these sources, the capacitance 6 is charged by means of the voltage source 11. This is effected during those periods when the transmitter is in a passive state, i.e. when the transmitter does not impress a dominant state on the databus.

The two further, third and fourth DMOS transistors 9 and 10 provided as switching means have their sources coupled to the two terminals of the capacitance and their drains coupled to the two lines 1 and 2 of the CAN databus. The third DMOS transistor is of the p-channel type, and the fourth is of the n-channel type. Also these DMOS transistors can be switched to the active state by means of voltage sources 14 and 15 which supply control signals. The two DMOS transistors 9 and 10 are actively switched during those periods when the transmitter is in an active state in which it impresses a dominant state on the databus.

It is essential that the capacitance 6 is alternatively connected either to the voltage source 11 by means of the DMOS transistors 7 and 8 or to the databus lines 1 and 2 of the CAN databus by means of the DMOS transistors 9 and 10. The capacitance 6 must never be connected simultaneously to both the voltage source 11 and the databus.

As already stated above, the capacitance 6 is charged by means of the voltage source 11 when the transmitter is in the passive state. Then, the transistors 7 and 8 are turned on and the transistors 9 and 10 are turned off. When the transmitter is to be set to the active state and impress a dominant state on the databus, the transistors 7 and 8 are turned off and, subsequently, the transistors 9 and 10 are turned on. The charged capacitance 6 is then connected to the databus and impresses a dominant state on this databus. The two lines 1 and 2 of the databus are then not coupled to the fixed potential, as is the case in prior-art solutions. The capacitance rather has a floating potential and the voltage of the two databus lines 1 and 2 is exclusively determined by the current which flows through the capacitance 6. It is thereby achieved that, also during switch-on, there is no disturbing electromagnetic radiation by the databus lines 1 and 2, even when the DMOS transistors 9 and 10 have different switching characteristics.

Normally, a dominant state is impressed on the databus only during fixed time phases during which the charge of the capacitance 6 is sufficient to impress the dominant state on the databus. In the case of failure, it might occur that it is attempted to impress a dominant state on the databus during longer phases, which is not allowed in accordance with the CAN protocol. The capacitance can maintain the dominant state only for a limited period of time. In that case, however, the capacitance 6 would represent a capacitive load between the two databus lines 1 and 2. To prevent this, a first diode 16 and a second diode 17 are arranged between the capacitance 6 and the two databus lines 1 and 2. The anode of the first diode 16 is coupled to a first terminal of the capacitance 6 and the anode of the second diode 17 is coupled to the second line 2 of the databus. It is thereby achieved that, also in such a case, the capacitance 6 for the databus or its lines 1 and 2 does not operate as a capacitive load in the case of incorrect functioning of the transmitter.

Due to interference signals at the databus lines, which may be caused, for example, by short circuits or electromagnetic radiation, the potentials of the two databus lines may be higher than the potential of the positive terminal of the voltage source 11 or lower than the potential of its negative terminal. When such a case occurs during the active state of the transmitter, in which the DMOS transistors 9 and/or 10 are turned on, the potentials at the capacitance 6 approximately correspond to those of the databus lines. To prevent that no current can flow between the capacitance 6 and the voltage source in this case, in spite of the potential difference and the internal diodes of the DMOS transistors 7 and 8, a third diode 18 and a fourth diode 19 are provided. The diode 18 is connected between the two DMOS transistors 7 and 9 and its anode is coupled to the positive terminal of the voltage source 11. The diode 19 is connected between the two DMOS transistors 8 and 10 and its anode is coupled to the second line 2 of the CAN databus.

Furthermore, a fifth DMOS transistor 20 is provided, which is of the n-channel type and is connected in parallel with the third DMOS transistor 9, while its source is coupled to the first line of the CAN databus and its drain is coupled to the first terminal of the capacitance 6. The gate of this fifth DMOS transistor 20 is controlled by means of the current source 15, which in the active state of the transmitter actively switches the transistor 10.

It is achieved by this fifth DMOS transistor 20 that, in the case of a short-circuit of the line 1 (CAN_H) to the reference potential, this line 1 is connectable to the capacitance by means of the fifth transistor 20. In fact, in such a short-circuit case, the p-channel MOSFET 9 can no longer be turned on because its drain with the line 1 is already connected to ground and would require a negative gate-source voltage in the turned-on state (i.e. with source=drain), but in which voltages which are more negative than the reference potential are not available.

For this reason, the redundant n-channel MOSFET 20 is used parallel thereto, which in normal cases can generally not be turned on correctly because CAN_H (its source) conveys a too positive signal in normal cases, but in special short-circuit cases, where CAN-H=0 V, the transistor 20 can be turned on and take over the function of the transistor 9.

In summary, transistor 9 can be turned on and transistor 20 can be turned on to a limited extent in normal cases, whereas transistor 20 can be turned on and transistor 9 can be turned on to a limited extent in the short-circuit case CAN_H=0 V. The MOSFET which can be switched on to a limited extent is either turned off when it should be off or turned on when it may be on, or not turned on although it might be turned on. In so far, it does not disturb the operation.

In the FIGURE, four voltage sources 12, 13, 14 and 15 supplying the control signals are provided for the four DMOS transistors 7, 8, 9 and 10 used as switching means and for the possibly advantageously provided DMOS transistor 20. Generation of the control signals can be clearly simplified in that only one control signal is provided for controlling all of these DMOS transistors. However, at a transition of the transmitter from the active to the passive state, the control signal should be delayed before it is applied to the two DMOS transistors 7 and 8, and at a transition of the transmitter from the passive to the active state, the control signal should be delayed before it is applied to the other two DMOS transistors 9 and 10. It is thereby achieved that the capacitance 6 is initially separated from the voltage source and then first connected to the databus, or, conversely, first separated from the databus and then connected to the voltage source. When such a delay is initiated, one control signal is sufficient so that a further simplification is realized.

In summary, it can be stated that due to the use of the capacitance, which is alternatively charged by the voltage source or connected to the databus, the electromagnetic radiation can be reduced during those periods in which there is a transition from the active to the passive state of the transmitter, or conversely. This is effected in that, in the active state of the transmitter, no fixed potential is impressed on the two lines 1 and 2 of the databus, but that they are connected to the capacitance 6 which has a floating potential. The voltage in the databus lines 1 and 2 is then essentially only determined by the current that flows through the capacitance 6.

What is claimed is:

1. A transmitter for a two-wire, differential databus on which a dominant state can be impressed by means of the transmitter in an active state of the transmitter, and which is in a recessive state when all transmitters connected to the databus are in a passive state, characterized in that the transmitter is provided with a capacitance (6) and switching means (7,8,9,10) by means of which the capacitance (6) can be alternatively coupled to an electric source (11) or between the two databus lines (1, 2), and in that the switching means (7,8,9,10) charge the capacitance (6) by means of the electric source (11) during periods when the transmitter is in a passive state, couple the capacitance (6) between the two databus lines (1, 2) during periods when the transmitter is in an active state, and in that a first diode (16) is coupled between a first terminal of the capacitance (6) and the first line (1) of the databus, and a second diode (17) is coupled between a second terminal of the capacitance (6) and the second line (2) of the databus.

2. A transmitter as claimed in claim 1, characterized in that the switching means (7,8,9,10) comprise a first and a second electronic switch (7,8) by means of which the capacitance (6) is connectable to both terminal s of the electric source (11), and a third and a fourth electronic switch (9,10) by means of which the capacitance (6) is connectable to the two databus lines (1,2).

3. A transmitter as claimed in claim 1, characterized in that the electric source is a voltage source (11).

4. A transmitter as claimed in claim 2, characterized in that the electronic switches are transistors (7,8,9,10).

5. A transmitter as claimed in claim 3, characterized in that the transistors are DMOS transistors (7,8,9,10).

6. A transmitter as claimed in claim 5, characterized in that a third diode (18) is coupled between the voltage source (11) and the first line (1) of the databus, and a fourth diode (19) is coupled between the voltage source (11) and the second line (2) of the databus.

7. A transmitter as claimed in claim 5, characterized in that the third electronic switch (9) in the form of a DMOS transistor, by means of which that line (1) of the databus is connectable to the capacitance (6) which has a high level in the dominant state, is arranged parallel to a fifth electronic switch (20) in the form of a DMOS transistor, such that said transistor can be turned on, also in the case of a short circuit of this line (1) of the databus.

8. A transmitter as claimed in claim 2, characterized in that a control signal for controlling the electronic switches (7,8,9,10) is provided, in which, in the case of a transition of the transmitter from the active to the passive state, the control signal is delayed before it is applied to the first and the second electronic switch (7,8) and, in the case of a transition of the transmitter from the passive to the active state, the control signal is delayed before it is applied to the third and the fourth electronic switch (9,10).

9. A transmitter as claimed in claim 1, characterized in that the databus is a CAN bus.

10. A transmitter for a two-wire, differential databus on which a dominant state can be impressed by means of the transmitter in an active state of the transmitter, and which is in a recessive state when all transmitters connected to the databus are in a passive state, characterized in that the transmitter is provided with a capacitance (6) and DMOS transistors (7,8,9,10) by means of which the capacitance (6) can be alternatively coupled to a voltage source (11) or between the two databus lines (1, 2), in that the DOMOS transistors (7,8,9,10) charge the capacitance (6) by means of the electric source (11) during periods when the transmitter is in a passive state, and couple the capacitance (6) between the two databus lines (1, 2) during periods when the transmitter is in an active state, in that the switching means (7,8,9,10) comprise a first and a second electronic switch (7,8) by means of which the capacitance (6) is connectable to both terminal s of the electric source (11), and a third and a fourth electronic switch (9,10) by means of which the capacitance (6) is connectable to the two databus lines (1,2), and in that the third electronic switch (9) in the form of a DMOS transistor, by means of which that line (1) of the databus is connectable to the capacitance (6) which has a high level in the dominant state, is arranged parallel to a fifth electronic switch (20) in the form of a DMOS transistor, such that said transistor can be turned on, also in the case of a short circuit of this line (1) of the databus.

11. A transmitter as claimed in claim 10, characterized in that a first diode (16) is coupled between a first terminal of the capacitance (6) and the first line (1) of the databus, and a second diode (17) is coupled between a second terminal of the capacitance (6) and the second line (2) of the databus.

12. A transmitter as claimed in claim 10, characterized in that a third diode (18) is coupled between the voltage source (11) and the first line (1) of the databus, and a fourth diode (19) is coupled between the voltage source (11) and the second line (2) of the databus.

13. A transmitter as claimed in claim 10, characterized in that a control signal for controlling the electronic switches (7,8,9,10) is provided, in which, in the case of a transition of the transmitter from the active to the passive state, the control signal is delayed before it is applied to the first and the second electronic switch (7,8) and, in the case of a transition of the transmitter from the passive to the active state, the control signal is delayed before it is applied to the third and the fourth electronic switch (9,10).

14. A transmitter as claimed in claim 10, characterized in that the databus is a CAN bus.

* * * * *